Sept. 16, 1930.　　　　　L. E. YOUNIE　　　　　1,775,984
DIPPER TOOTH STRUCTURE
Filed Oct. 23, 1928

Lewis E. Younie
INVENTOR.

BY
ATTORNEY

Patented Sept. 16, 1930

1,775,984

UNITED STATES PATENT OFFICE

LEWIS E. YOUNIE, OF PORTLAND, OREGON, ASSIGNOR TO ELECTRIC STEEL FOUNDRY COMPANY, OF PORTLAND, OREGON, A CORPORATION OF OREGON

DIPPER-TOOTH STRUCTURE

Application filed October 23, 1928. Serial No. 314,466.

Dipper teeth as used in ordinary dipper buckets used in excavating work, such as power shovels, and drag line buckets, are subjected to very severe strains. It is desirable to make such teeth reversible so that the wear on them may be made more uniform. The present invention is designed to improve these teeth and the structure supporting them so as to prevent undue breakage. Features and details of the invention will appear from the specification and claims.

A preferred embodiment of the invention is illustrated in the accompanying drawings as follows:—

Figure 1:
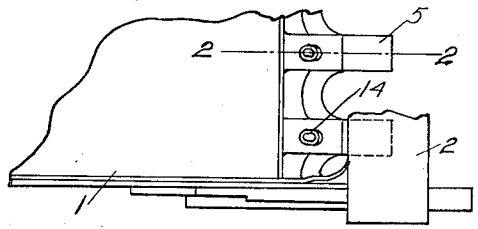

Fig. 1 shows a plan view of a portion of a drag line bucket with the teeth in place.

Figure 2:
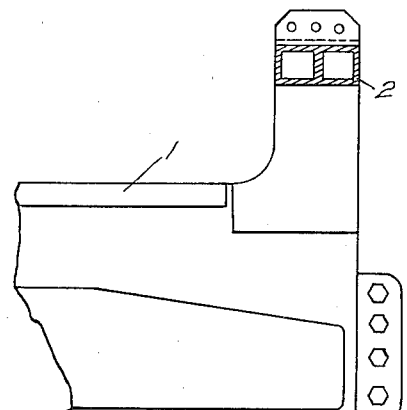

Fig. 2 a section on the line 2—2 in Fig. 1.

Figure 3:
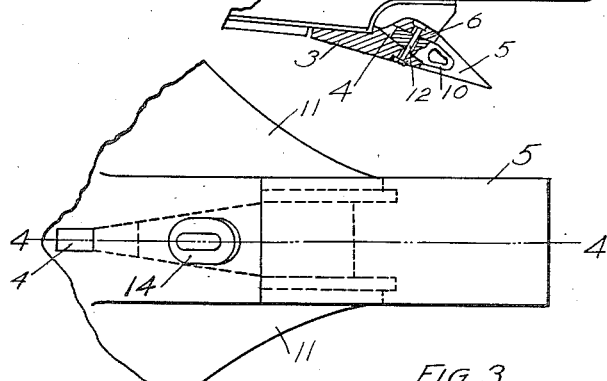

Fig. 3 a detached enlarged view of a single tooth.

Figure 4:
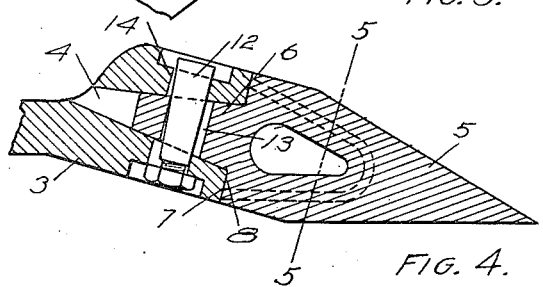

Fig. 4 a section on the line 4—4 in Fig. 3.

Figure 5:
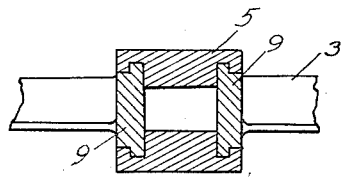

Fig. 5 a section on the line 5—5 in Fig. 4.

Figure 6:
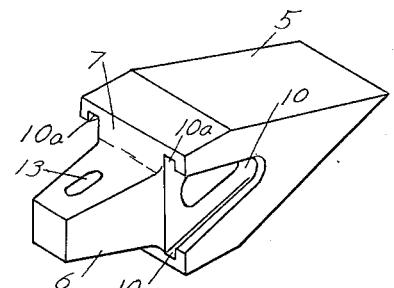

Fig. 6 a perspective view of a detached tooth.

Figure 7:
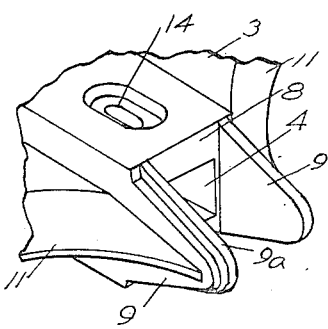

Fig. 7 a perspective of the tooth socket and tooth supporting structure immediately adjacent thereto.

1 marks the bucket which may be of any construction, as shown, a drag line bucket provided with an arch 2. The lip of the bucket, as shown, is formed with a casting 3 in which are arranged tooth sockets 4. A tooth 5 is provided with a shank 6 which extends into the socket 4. It is provided with a shoulder 7 between the shank and tooth proper and this engages a shoulder 8 on the edge of the lip. Projections 9 extend forwardly from the lip at each side of the socket 4 into recesses 10 arranged in the sides of the tooth 5. These projections strengthen the tooth particularly the attachment between the tooth and the support through the shank. These projections are further strengthened by webs 11 which extend out along the sides of projections and thus re-enforce these projections against side strain. The usual key 12 extends through an opening 13 in the shank and openings 14 in the lip. In order that the webs 11 may be used this opening is arranged in an upright, or vertical direction as distinguished from a side-wise direction.

I prefer to provide the recesses 10 with undercut edges 10$^a$ into which the forward end of the projections 9 extend, the projections 9 being provided with ribs 9$^a$ which engage the edges of the recess 10. By extending the edges of the projections 9 into the undercut portions both projections are locked with the tooth and assist in sustaining the shocks on the tooth in all directions and particularly in the sidewise direction.

What I claim as new is:—

1. In a dipper construction, the combination of a tooth support having a shank-receiving socket; projections extending forwardly from the sides of the socket; re-enforcing webs on the support extending from the sides of the projections; and a tooth having a shank extending into the socket and recesses in its sides receiving the projections.

2. In a dipper construction, the combination of a tooth support having a tooth-receiving socket; projections extending forwardly from the sides of the socket; re-enforcing webs on the support extending from the sides of the projections; and a tooth having a shank extending into the socket and recesses in its sides, said recesses having undercut edges receiving the projections.

In testimony whereof I have hereunto set my hand.

LEWIS E. YOUNIE.